United States Patent [19]

Oh

[11] Patent Number: 5,352,107
[45] Date of Patent: Oct. 4, 1994

[54] APPARATUS FOR SENSING INCOMPLETE MOLDING OF AN AUTOMOLD SYSTEM

[75] Inventor: Yong Young Oh, Choongcheongbook-Do, Rep. of Korea

[73] Assignee: Goldstar Electron Co., Ltd., Rep. of Korea

[21] Appl. No.: 993,426

[22] Filed: Dec. 21, 1992

[30] Foreign Application Priority Data

Dec. 23, 1991 [KR] Rep. of Korea ............... 23611/1991

[51] Int. Cl.⁵ ............................................. B29C 45/76
[52] U.S. Cl. ..................................... 425/141; 264/40.1; 264/40.4; 425/140; 425/172
[58] Field of Search ............... 425/136, 137, 140, 141, 425/169, 171, 172, 437, 444; 264/40.1, 40.4

[56] References Cited

U.S. PATENT DOCUMENTS

| | | | |
|---|---|---|---|
| 2,196,268 | 4/1940 | Lyng | 425/171 |
| 2,790,204 | 4/1957 | Edwards et al. | 425/137 |
| 4,412,798 | 11/1983 | Avellino et al. | 425/137 |
| 4,515,544 | 5/1985 | Boehm et al. | 425/137 |
| 4,571,320 | 2/1986 | Walker | 425/137 |
| 4,603,329 | 7/1986 | Bangerter | 425/137 |

FOREIGN PATENT DOCUMENTS

| | | | |
|---|---|---|---|
| 46-1873 | 1/1971 | Japan | 425/137 |
| 3-234608 | 10/1991 | Japan | 425/136 |

*Primary Examiner*—Jay H. Woo
*Assistant Examiner*—Joseph Leyson
*Attorney, Agent, or Firm*—Scully, Scott, Murphy & Presser

[57] ABSTRACT

An apparatus for sensing incomplete molding of an automold system in process for molding semiconductor packages. The apparatus including an unloader unit having vacuum heads mounted on a horizontal plate of the unloader unit, and a plurality of devices for sensing incomplete molding formed at the horizontal plate at both sides of each of the vacuum heads, each of the devices corresponding to a cavity, each cavity containing a package, each device comprising a guide hole formed at either side of each of the vacuum heads of the horizontal plate of the unloader unit, a detect pin inserted in the guide hole which is adapted to be raised and lowered depending upon the condition of resin filled in a package, a spring inserted on the detect pin and in the hole to bias the detect pin downward, and a sensor fixedly mounted on the hole of the horizontal plate which is adapted to sense the upward and downward movement of the detect pin depending on the condition of resin filled in a package and to generate signal corresponding to incomplete filling of package.

4 Claims, 5 Drawing Sheets

APPARATUS FOR SENSING INCOMPLETE MOLDING OF AN AUTOMOLD SYSTEM

BACKGROUND OF THE INVENTION

1. Field of the Invention

The present invention relates to an apparatus for sensing incomplete molding of an automold system, and more particularly to an apparatus for sensing incomplete molding of an automold system, the apparatus including devices having a sensor and detect pin for detecting incompletely filled and fine unfilled junk portions of semiconductor packages. Each device is installed in an unloader unit of an automold system so as to efficiently sense fine incomplete filling of every package.

2. Description of the Prior Art

In a usual process for manufacturing semiconductor package, after a wire bonding procedure for electrically connecting semiconductor chips to inner leads of lead frames by means of a gold wire, a molding procedure for encapsulating the wire bonded chip and inner leads by using resin such as epoxy resin to protect them against outer circumstances (humidity, temperature. etc.) is carried out.

Such molding procedure is generally carried out by using an automold system. The automold system comprises a master mold die to be separated into a top mold die and a bottom mold die and an unloader unit which is adapted to take out packages of the bottom mold die after the molding procedure is completed in the master mold die.

Since the automold system does not have a separate apparatus for sensing incomplete molding of packages, incomplete molding of packages is sensed by determining whether every package is incompletely filled with compound when the package is taken out of cavity of the bottom mold die by the unloader unit.

Referring to FIG. 1, there is shown a conventional unloader unit of an automold system. As shown in the drawing, lower chassis 3 and 3' are formed with a plurality of cavities 3a each containing a molded package 2 and mounted on a bottom mold die 1. Above the bottom mold die 1 is located an unloader unit 6 which is moved leftward and rightward along a transfer guide 5 by driving a servomotor shaft 4.

The unloader unit 6 is provided with a vacuum system. The vacuum system comprises a micro ejector 7 attached to a front side of a vertical wall 6a of the unloader unit 6 which is adapted to control vacuum conditions and sense incomplete molding of packages, vacuum heads 9 and 9' mounted on a horizontal plate 6b of the unloader unit 6 and connected to the micro ejector 7 via a vacuum hose 8, and a plurality of vacuum pad guides 11 which protrude downward from the vacuum heads 9 and 9' and have at ends thereof vacuum pads 10 for generating vacuum suction force by control of the micro ejector 7 in order to suck and hold packages 2 received in the cavities 3a of the lower chassis 3 and 3'.

Also, the unloader unit 6 is provided with a micro switch (not shown) which is turned on/turned off to generate control signal depending upon whether suction force is normally generated in the micro ejector 7. Positioning bars 12 are fixed to the bottom mold die 1 in order to set precise position of the unloader unit 6 relative the bottom mold die 1. The micro ejector 7 is connected to an air hose 13 through which air is sucked and discharged via the vacuum pads 10 to hold and release the packages 2.

In the above-mentioned conventional apparatus for sensing incomplete molding, after molded packages 2 are sucked at the vacuum pads 10 and then sensed whether the packages 2 are completely filled with compound or not, the packages 2 are transferred to a gate brake unit (not shown) via a carrier unit (not shown).

An operation of the above known apparatus for sensing incomplete molding will be described with reference to FIGS. 1 and 2 as follows.

After molding procedure has been completed, a press is opened and a top mold die (not shown) is separated from the bottom mold die 1. Then, lead frames 14 are ejected from the chassis 3 and 3' of the bottom mold die 1 by means of eject pins. Since the lead frames 14 each are integrally formed with the package 2 molded in the cavity 3a, the packages 2 are also ejected from the cavities 3a by the ejection of the lead frames 14.

Thereafter, the unloader unit 6 is moved to and located above the bottom mold die 1. Then, the bottom mold die 1 is raised such that the positioning bars 12 fixed to the bottom mold die 1 are inserted into holes formed at the horizontal plate 6b of the unloader unit 6, thereby causing upper surfaces of the packages 2 to be closely contacted with the vacuum pads 10.

Subsequently, the micro ejector 7 of the vacuum system is operated to produce a vacuum in the vacuum heads 9 and 9'. As a result, the vacuum pads 10 generate suction force so that the packages 2 is sucked or held at the vacuum pads 10.

At this time, normally molded package 2 is forcibly sucked and held at the vacuum pad 10 because normal suction force is generated in the micro ejector 7. As a result, since the normal suction force is sensed by a micro switch (not shown), it is indicated that the package has been normally molded. In this case, the indication of normality/abnormality of molding is displayed from a CRT or a display unit by control of a controller (not shown) in response to output signal of the micro switch.

On the other hand, as shown in FIG. 2, when a package has been incompletely molded so that the package has an incomplete filling portion (hatching portion in the drawing), the package is not sucked and held at the vacuum pad 10 because abnormal suction force is generated in the vacuum pad 10 due to the unfilled portion of the package. Accordingly, the abnormal suction force is also generated in the micro ejector 7. As a result, the micro switch (not shown) senses the abnormal suction force and then generates an error signal indicating that the package has been incompletely molded, thereby indicating presence of the unfilled portion in package.

However, although the above conventional apparatus for sensing incomplete molding can sense an abnormal package when the package has a large unfilled portion as shown in FIG. 2, the apparatus can not sense an abnormal package when the package has a fine unfilled portion so that a number of poor packages may be produced.

Also, since the apparatus has not the number of vacuum pads corresponding to the number of packages but a predetermined number of vacuum pads per a lead frame, the apparatus can not sense every poor package.

In addition, when the vacuum pad guides 11 connected to the vacuum heads 9 and 9' are blocked due to foreign substance which damage the vacuum pads, the apparatus can not sense poor package.

SUMMARY OF THE INVENTION

The present invention has been made in view of the above-described problems occurring in the prior art and an object of the invention is to provide an apparatus for sensing incomplete molding of an automold system comprising an unloader unit having the same number of devices for sensing incomplete filling as that of cavities thereby achieving reduction of poor packages and improvement of productivity.

In accordance with the present invention, the object mentioned above can be accomplished by providing an apparatus for sensing incomplete molding of automold system comprising an unloader unit having vacuum heads mounted on a horizontal plate of the unloader unit, and a plurality of devices for sensing incomplete molding formed at the horizontal plate and at both sides of each of the vacuum heads, each of the devices corresponding to each of the cavities each containing a package, each said device for sensing incomplete molding comprising: a guide hole formed at either side of each of the vacuum heads of the horizontal plate of the unloader unit which has an upper larger diameter part and a lower smaller diameter part; a detect pin inserted in the guide hole which is adapted to be raised and lowered depending upon the presence of resin filled in a junk of a package by contact of its lower point with the resin of the junk; a spring inserted on the detect pin and in the hole to bias the detect pin downward; and a sensor assembly for sensing unfilled portion fixedly mounted on the hole of the horizontal plate which is adapted to sense the upward and downward movement of the detect pin depending to condition of resin filled in a package and to generate a signal corresponding to incomplete filling of package.

In operation of the above apparatus for sensing incomplete molding according to the invention, after the unloader unit is moved to and above a bottom mold die, the bottom mold die is raised so that packages on the bottom mold die come into contact with vacuum pads and the detect pins of the unloader unit respectively. At this time, when a package has been normally molded, the detect pin is raised by being contacted with compound has been normally filled in the junk of the package. As a result, the sensor senses the raised upper end of the detect pin and then indicates condition of normal molding of the package. On the other hand, when a package has been abnormally molded so that the package has an unfilled portion, the detect pin is inserted in the junk of the package because the junk of the package is not filled with compound. As a result, the sensor senses the lowered upper end of the detect pin and then indicates condition of abnormal molding of the package. Accordingly, the apparatus of the invention can sense incomplete molding of every package as well as a fine unfilled portion of every package, thereby achieving reduction of poor products and improvement of productivity.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

An apparatus for sensing incomplete molding according to the present invention will now be described by referring to FIGS. 3 to 6 in the accompanying drawings.

Figure 1:
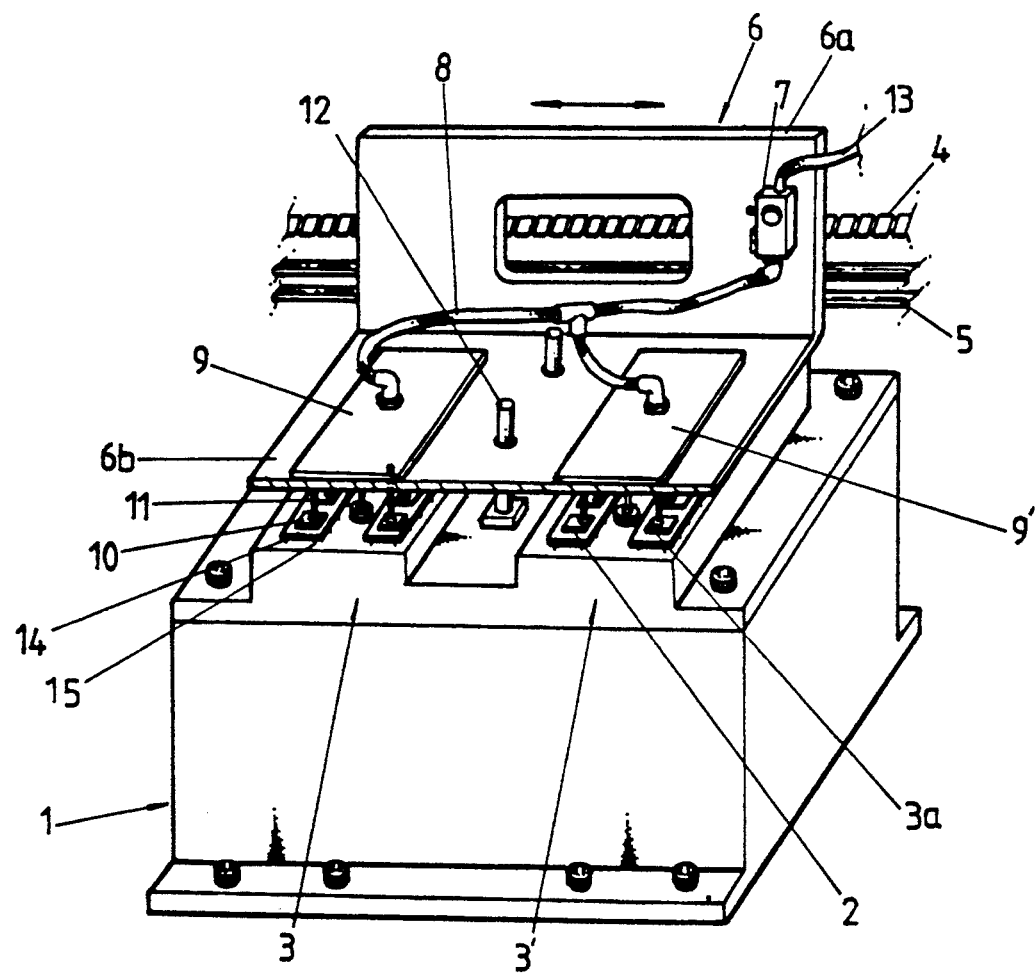
FIG. 1 is a perspective view of a conventional unloader unit of automold system.
Figure 2:
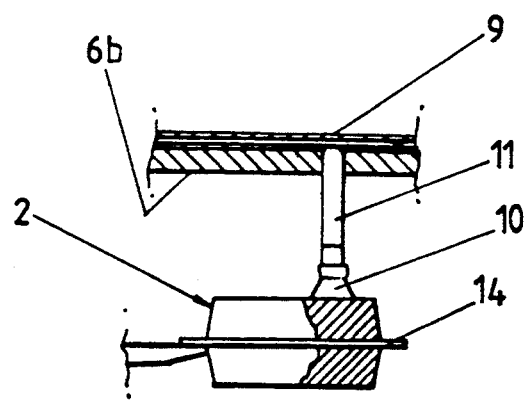
FIG. 2 is an enlarged view of a sensing part of the unloader unit shown in FIG. 1.
Figure 3:
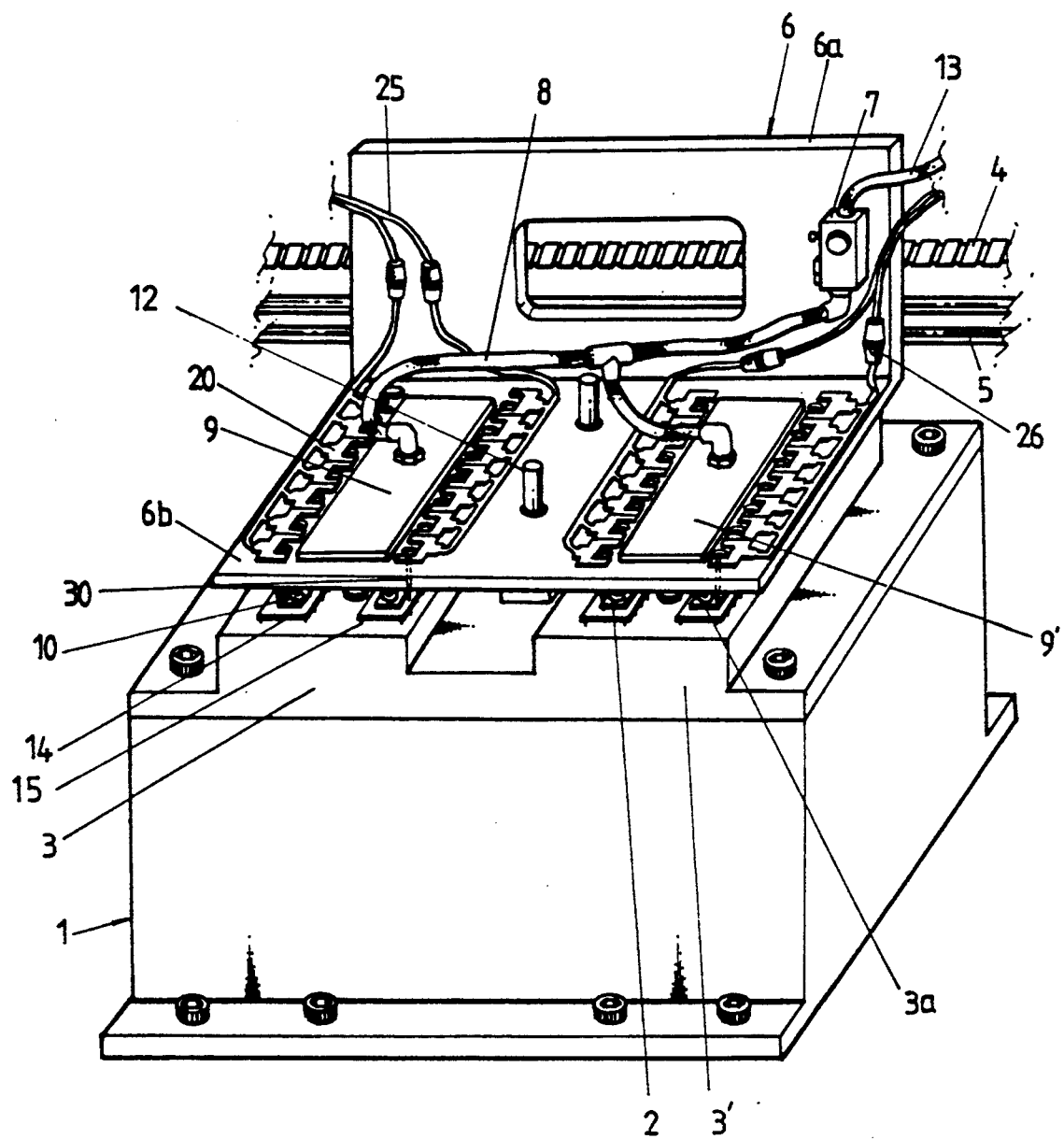
FIG. 3 is a perspective view of an apparatus for sensing incomplete molding of automold system according to the present invention.

Referring to FIG. 3, there is shown an apparatus for sensing incomplete molding according to the invention. In the apparatus for sensing incomplete molding shown in the drawing, a pair of chassis 3 and 3' each having a plurality of cavities 3a are mounted on a master mold die 1. Above the master mold die 1 is located a horizontal plate 6b of an unloader unit 6, which is movable leftward and rightward. The horizontal plate 6b is provided with vacuum heads 9 and 9' each having a plurality of downward protruding vacuum pads 10 for sucking molded packages 2. A micro ejector 7 for controlling the vacuum heads 9 and 9' is mounted on a vertical wall 6a of the unloader unit 6. The same number of devices for sensing incomplete molding as that of the cavities 3a are mounted both sides of each of the vacuum heads 9 and 9' and on the horizontal plate 6b of the unloader unit 6 to detect unfilled portions in every cavity 3a.

Figure 4A:
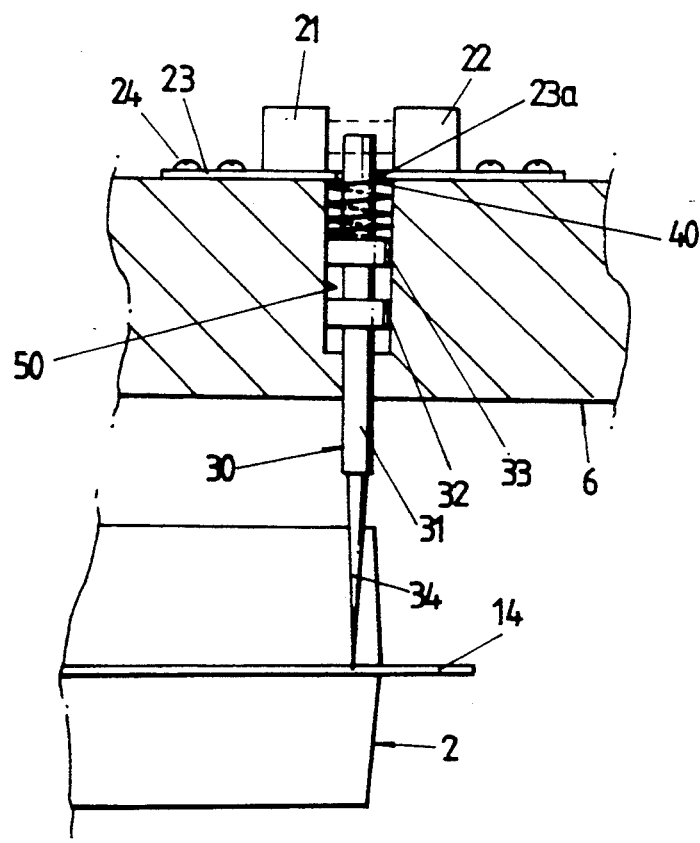
FIG. 4A is a sectional view of a device for sensing incomplete molding according to the invention which has a detect pin operating on a package that has been normally molded.
Figure 5A:
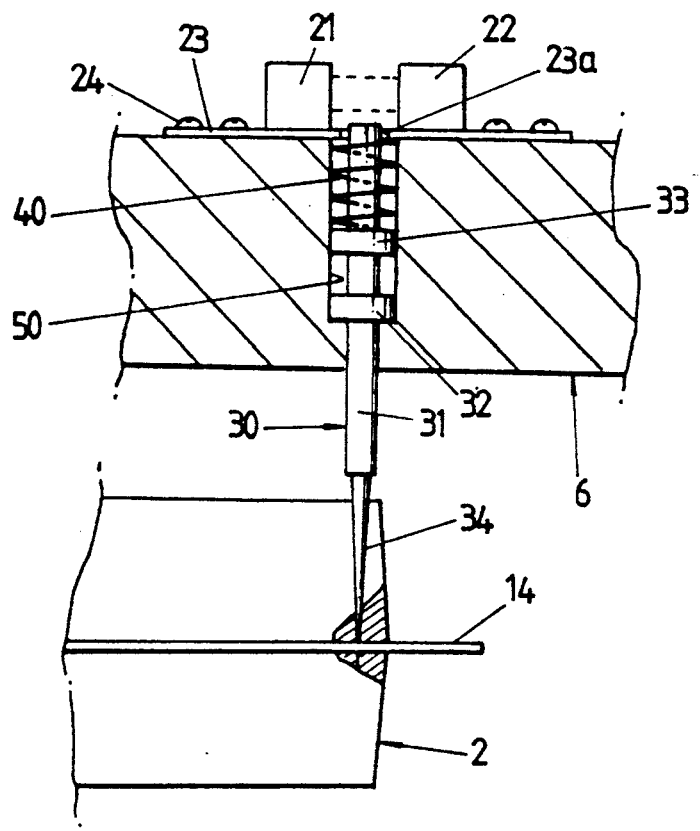
FIG. 5A is a sectional view of the device for sensing incomplete molding according to the invention which has a detect pin operating on a package that has an unfilled portion due to abnormal molding.

Referring to FIGS. 4A and 5A, there is shown a device for sensing incomplete molding according to the present invention. As shown in the drawings, the device for sensing incomplete molding according to the invention comprises a guide hole 50 formed at the horizontal plate 6b of the unloader unit 6 and at either side of each of the vacuum heads 9 and 9' which has an upper larger diameter part and a lower smaller diameter part, a detect pin 30 inserted in the guide hole 50 which is adapted to be raised and lowered depending upon the condition of resin filled in a junk 2a of a package 2 by contact of its lower point with the resin of the junk 2a, a spring 40 inserted on the detect pin 30 and in the hole 50 to bias the detect pin 30 downward, and a sensor assembly 20 fixedly mounted on the hole 50 of the horizontal plate 6b which is adapted to sense the upward and downward movement of the detect pin 30 depending upon the condition of resin filled in a package and to generate a signal corresponding to incomplete filling of the package. In this case, it is preferable to use the spring 40 having relative low elasticity.

The detect pin 30 comprises a pin body 31 inserted in the guide hole 50, a point 34 formed at a lower end of the pin body 31 which is to be contacted with a junk portion 2a of a package 2, a lower flange 32 integrally formed at the pin body 31 which is adapted to be engaged with the lower smaller diameter part of the guide hole 50 to prevent the pin body 31 from slipping out of the guide hole 50, and an upper flange 33 integrally formed at the pin body 31 which is adapted to be engaged with the spring 40 to bias the detect pin 30 downward.

The sensor assembly 20 comprises a sensor supporting plate 23 fixed to an upper surface of the horizontal plate 6b of the unloader unit 6 by a plurality of screws 24 which is formed with a through hole 23a such that an upper end of the detect pin 30 is inserted in the through hole 23a and an upper end of the spring 40 is engaged with a circumference of the through hole 23a to prevent the spring 40 from being separated from the guide hole 50, an optical sensor 21, 22 fixed to an upper surface of the sensor supporting plate 23 at both sides of the through hole 23a which is adapted to sense an upper end of the detect pin 30 protruded through the through hole 23a, and a sensor cable 25 connected between the optical sensor 21, 22 and a control device (not shown) which is adapted to transmit driving signal for driving the optical sensor 21, 22 and sensing signal sensed by the optical sensor 21, 22.

The unloader unit 6 on which devices for sensing incomplete molding according to the invention are mounted may be applied only to transfer packages to a carrier unit by using a conventional vacuum system. Also, although the unloader unit 6 may be modified to a clamp type system without a mechanical type or vacuum system (a micro ejector, a vacuum hose, vacuum heads and vacuum pads) so as to hold and transfer packages simply and positively, the clamp type system is not shown in the drawings.

In addition, although an embodiment of the invention adopted the optical sensor 21, 22 as the sensor for incomplete molding, another embodiment of the invention can adopt a switch or a sensor capable of sensing upward and downward movement of the detect pin 30, such as a micro switch.

Operation of the apparatus for sensing incomplete molding of automold system according to the present invention will be described hereinafter.

When molded packages are raised by ejector pins, the unloader unit 6 is moved to the bottom mold 1 and located above the bottom mold die 1. Subsequently, the bottom mold die 1 is raised or the unloader unit 6 is lowered so that the vacuum pads 10 of the unloader unit 6 of the bottom mold die 1 come into contact with upper surfaces of packages 2 respectively.

Then, the detect pins 30 which have been precisely located on the junk portion 2a of packages 2 respectively press resin filled in the junk portion 2a of the packages 2 respectively to detect incomplete molding of the packages 2.

Figure 4B:
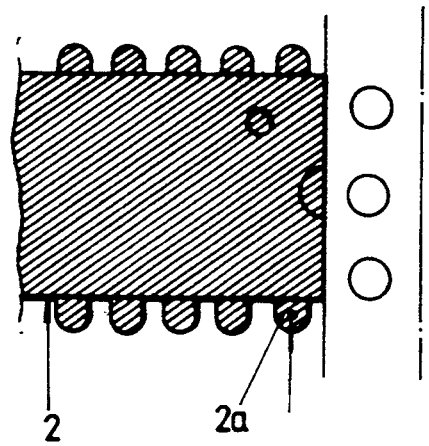
FIG. 4B is a plan view of the package and lead frame of FIG. 4A.

At this time, when the package 2 have been normally molded as shown in FIGS. 4A and 4B, the detect pin 30 is raised upwards because the point 34 of the detect pin 30 comes into contact with resin filled in the junk portion 2a of the package 2. As a result, since the upper end of the detect pin 30 is located between the light emitting sensor 21 and the light receiving sensor 22, light from the light emitting sensor 21 can not reach the light receiving sensor 22, thereby generating a signal that the package 2 has been normally molded.

Figure 5B:
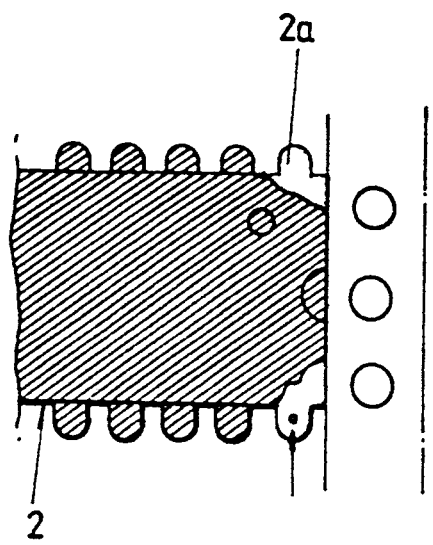
FIG. 5B is a plan view of the package and lead frame of FIG. 5A.

On the other hand, when the package 2 has been abnormally molded so that the package 2 has an unfilled portion at its junk portion 2a as shown in FIGS. 5A and 5B, the point 34 of the detect pin 30 passes through the junk portion 2a. As a result, since the upper end of the detect pin 30 is not located between the light emitting sensor 21 and the light receiving sensor 22, light from the light emitting sensor 21 reaches the light receiving sensor 22, thereby generating signal that the package 2 has an unfilled portion.

Thereafter, the output signal from the sensor 20 is applied to a controller (not shown) through the sensor cable 25 and then the controller controls a CRT or a display unit to indicate condition of normal or abnormal molded package.

In the apparatus for sensing incomplete molding according to the invention, since the detect pins 30 are provided for all packages 2 respectively, the apparatus of the invention can precisely sense an incomplete molded package even though any of the packages has unfilled portion.

After the determination of incomplete molding of packages has been completed, the unloader unit 6 transfers the packages 2 to the carrier unit (not shown). At this time, the detect pins 30 which have been raised by being contacted with resin of normally molded packages are again lowered or returned to an original position by biasing force of the spring 40.

Figure 6:
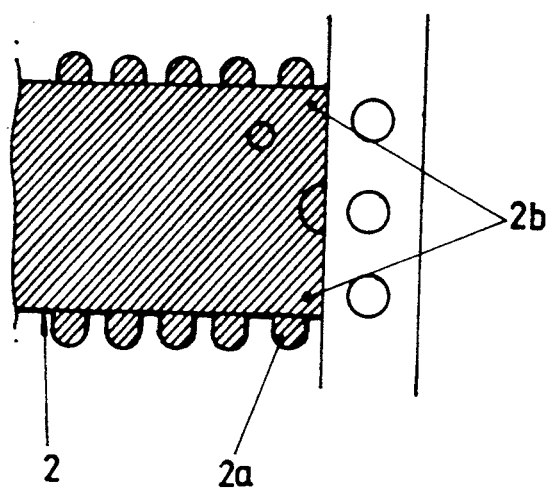
FIG. 6 is a plan view of a package and lead frame showing location of the detect pin of the device for sensing incomplete molding of the invention when the package has a fine unfilled portion.

Even when the point 34 of the detect pin 30 can not pass through the junk portion 2a because the package 2 is very small so that the package 2 has a narrow junk portion as shown in FIG. 6, the apparatus for sensing incomplete molding of the invention can also sense a fine unfilled portion of the package by contacting the point 34 of the detect pin 30 with the corner portions 2b of an upper surface of the package 2.

As apparent from the sensing description of the invention, since the apparatus for sensing incomplete molding according to the present invention can precisely sense a severely unfilled portion of every package as well as a fine unfilled portion of every package, poor packages due to incomplete molding can be sensed early so that a production rate of poor packages and errors for sensing incomplete molding can be reduced. In addition, efficiency of the apparatus is maximized, thereby increasing productivity.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for sensing incomplete molding of packages formed by an automold system, the apparatus comprising an unloader unit having a horizontal plate with one or more vacuum heads mounted thereon, and a plurality of devices for sensing incomplete molding of packages, said devices mounted on the horizontal plate at both sides of each of the vacuum heads, each of the devices corresponding to a cavity formed on a bottom mold die of said automold system when the unloader unit is aligned above the bottom mold die, each cavity containing a package, each of said devices for sensing incomplete molding of packages comprising:

a guide hole extending through said horizontal plate of the unloader unit, said guide hole having an upper and a lower part, the upper part having a first diameter, and the lower part having a second diameter which is smaller than the first diameter;

a detect pin having a pin body and a point formed at a lower end of said pin body for contacting a resin filled junk portion of said package, said detect pin positioned in the guide hole such that the point extends outside of the guide hole and such that said detect pin is reciprocable therein between a raised position indicating a completely filled junk portion when contacted by said point, and a lowered position indicating an incompletely filled junk portion when contacted by said point, said pin body including a flange means located at a middle portion thereof and being reciprocable within said upper part of said guide hole, said flange means engaging said lower part of said guide hole so as to prevent the pin body from slipping out of the guide hole when said detect pin is in said lowered position, a sensor assembly for sensing the raised position and the lowered position of the detect pin depending upon the presence of resin in said junk portion and for generating a signal corresponding to incomplete filling of said package when the lower position is sensed, said sensor assembly having a sensor supporting plate fixed to said horizontal plate of the unloader unit and formed with a through hole positioned axially with said guide hole such that an upper end of the detect pin is positioned in the through hole and protrudes therefrom when said detect pin is in said raised position; and, a spring mounted on an upper end of said detect pin within said guide hole between said sensor supporting plate and said flange means, said spring engaging said sensor supporting plate and said flange means to resiliently bias said detect pin in a downward direction to said lowered position.

2. An apparatus in accordance with claim 1, in which said flange means comprises: a lower flange which engages said lower part of the guide hole to prevent the pin body from slipping out of the guide hole; and
an upper flange which engages the spring.

3. An apparatus in accordance with claim 1, in which said sensor assembly further comprises:
optical sensors fixed to an upper surface of the sensor supporting plate and operatively located at first and second sides of the through hole to sense said upper end of the detect pin protruding through the through hole when said detect pin is in said raised position; and
a sensor cable, connected between the optical sensors and a control device, which is adapted to transmit a driving signal for driving the optical sensors and to transmit a sensing signal when said upper end of said detecting pin is sensed by the optical sensors.

4. An apparatus in accordance with claim 1, in which said sensor assembly further comprises:
a micro switch fixed to an upper surface of the sensor supporting plate and operatively located at sides of the through hole to sense the raised position of the detect pin when the upper end of the detect pin protrudes through the through hole; and
a sensor cable, connected between the micro switch and a control device, which is adapted to transmit a driving signal for driving the microswitch and to transmit a sensing signal when said upper end of said detect pin is sensed by the microswitch.

* * * * *

UNITED STATES PATENT AND TRADEMARK OFFICE
CERTIFICATE OF CORRECTION

PATENT NO. : 5,352,107
DATED : October 4, 1994
INVENTOR(S) : Yong Young Oh

It is certified that error appears in the above-indentified patent and that said Letters Patent is hereby corrected as shown below:

Column 3, lines 43-45: "compound has been normally filled in the junk of the package." should read --compound filled in a junk of the package because the compound has been normally filled in the junk of the package.--

Column 6, line 35: "sensing" should read --above--

Signed and Sealed this

Twelfth Day of December, 1995

Attest:

BRUCE LEHMAN

Attesting Officer

Commissioner of Patents and Trademarks